United States Patent
Jamieson et al.

(10) Patent No.: US 9,988,129 B2
(45) Date of Patent: Jun. 5, 2018

(54) TRANSMISSION OF POWER UNDERWATER

(71) Applicant: Subsea 7 Limited, Sutton (GB)

(72) Inventors: James Andrew Jamieson, Balmedie (GB); Lee Wilson, Insch (GB)

(73) Assignee: Subsea 7 Limited, Sutton (GB)

( * ) Notice: Subject to any disclaimer, the term of this patent is extended or adjusted under 35 U.S.C. 154(b) by 0 days. days.

(21) Appl. No.: 15/107,459

(22) PCT Filed: Dec. 15, 2014

(86) PCT No.: PCT/GB2014/053702
§ 371 (c)(1),
(2) Date: Jun. 22, 2016

(87) PCT Pub. No.: WO2015/097437
PCT Pub. Date: Jul. 2, 2015

(65) Prior Publication Data
US 2016/0318591 A1    Nov. 3, 2016

(30) Foreign Application Priority Data

Dec. 23, 2013    (GB) .................................... 1322943.0

(51) Int. Cl.
*B63G 8/00*        (2006.01)
*H02J 50/10*       (2016.01)
(Continued)

(52) U.S. Cl.
CPC .............. *B63G 8/001* (2013.01); *B63C 11/52* (2013.01); *B63J 99/00* (2013.01); *H02J 7/025* (2013.01);
(Continued)

(58) Field of Classification Search
CPC ...................................................... B63G 8/001
See application file for complete search history.

(56) References Cited

U.S. PATENT DOCUMENTS 5,301,096 A    4/1994   Klontz et al.
6,167,831 B1   1/2001   Watt et al.
(Continued)

FOREIGN PATENT DOCUMENTS

DE    102013208070 A1 *  11/2014   .......... F03B 13/1845
JP    H07223589           8/1995
(Continued)

OTHER PUBLICATIONS

Translated Description DE102013208070; Nov. 2014.*
07223589JPA—Human translation of JPH07223589, "Charging System for Submersible Body" by Kenji Nishina; Date=Aug. 22, 1995.*

*Primary Examiner* — Jared Fureman
*Assistant Examiner* — James Evans
(74) *Attorney, Agent, or Firm* — Levy & Grandinetti

(57) ABSTRACT

A method provides power to a subsea equipment electrical system underwater, without a wet-mated electrical connection. The method includes temporarily coupling a rotary coupling element of a power source to the subsea equipment and turning that element to generate electric power on board the equipment. Subsea equipment that implements the method comprises: an on-board electric power generator connected to an electrical load such as a rechargeable battery to charge the battery when the generator is driven; and a rotary coupling element that is turned by an external drive to drive the generator. Alternative subsea equipment to implement the method comprises: a stator, but not a rotor, of an on-board electric power generator, which supplies current to the load when an externally-driven rotor is positioned adjacent to the stator and turned relative to the stator. A power source having a generator rotor is docked with the equipment for this purpose.

14 Claims, 7 Drawing Sheets

Figure 1A:
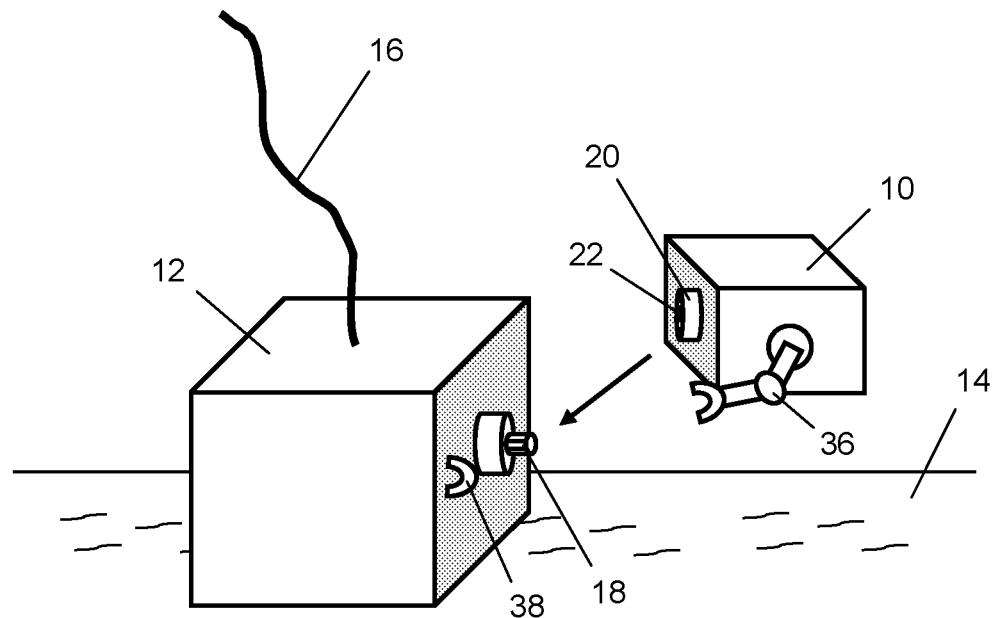

(51) Int. Cl.
  *B63J 99/00* (2009.01)
  *B63C 11/52* (2006.01)
  *H02J 7/02* (2016.01)
  *H02K 5/128* (2006.01)
  *H02K 7/18* (2006.01)
  *H02J 50/00* (2016.01)
  *H02K 5/12* (2006.01)
  *H02J 7/14* (2006.01)

(52) U.S. Cl.
  CPC .............. *H02J 50/00* (2016.02); *H02J 50/10* (2016.02); *H02K 5/12* (2013.01); *H02K 5/128* (2013.01); *H02K 7/1807* (2013.01); *B63G 2008/004* (2013.01); *B63G 2008/005* (2013.01); *B63G 2008/008* (2013.01); *H02J 7/1415* (2013.01)

(56) References Cited

U.S. PATENT DOCUMENTS

| | | | |
|---|---|---|---|
| 7,183,742 B2 | 2/2007 | Potter et al. | |
| 7,888,830 B2* | 2/2011 | Mori | B63J 3/02 310/58 |
| 8,125,097 B1* | 2/2012 | Lomerson, Sr. | F03B 13/1845 290/53 |
| 8,511,389 B2 | 8/2013 | Fenton | |
| 2004/0134403 A1* | 7/2004 | Moneuse | B63H 25/26 114/162 |
| 2004/0195840 A1* | 10/2004 | Baarman | C02F 1/325 290/43 |
| 2006/0240723 A1* | 10/2006 | Kubota | B63H 20/14 440/83 |
| 2008/0226467 A1* | 9/2008 | Vento | F04D 29/2277 417/53 |
| 2009/0095209 A1 | 4/2009 | Jamieson | |
| 2014/0346777 A1* | 11/2014 | Blanchet | H02K 5/12 290/54 |

FOREIGN PATENT DOCUMENTS

| | | |
|---|---|---|
| WO | WO94/09558 | 4/1994 |
| WO | WO01/21476 | 3/2001 |
| WO | WO2008/037349 | 4/2008 |
| WO | WO2009061562 | 5/2009 |
| WO | WO2013040296 | 3/2013 |
| WO | WO2013072690 | 5/2013 |
| WO | WO2013085030 | 6/2013 |
| WO | WO2013154097 | 10/2013 |

* cited by examiner

TRANSMISSION OF POWER UNDERWATER

This invention relates to the transmission or transfer of power underwater between discrete subsea systems that supply power and that receive power, particularly electric power.

The offshore oil and gas industry provides many examples of subsea systems that supply or receive electric power in support of exploration and production. They include: unmanned underwater vehicles (UUVs); skids for UUVs; subsea garages, docks or other charging points at which batteries of a UUV or its skid may be recharged; and autonomous tools or sensors powered by batteries that may, in turn, be recharged by a UUV or its skid.

As the invention is particularly apt for use with UUVs, such vehicles will be used in this specification to exemplify the inventive concept. However, the broad concept of the invention is not limited to use with UUVs: some applications of the invention could instead involve the use of manned submersibles or indeed divers in shallower water.

It is often necessary to perform tasks such as inspection, monitoring, maintenance and construction during subsea operations. Below diver depth, such tasks are generally performed by UUVs such as remotely-operated vehicles (ROVs) and autonomous underwater vehicles (AUVs).

ROVs are characterised by a physical connection to a surface support ship via an umbilical tether that carries power, data and control signals. They are typically categorised as work-class ROVs or inspection-class ROVs.

Work-class ROVs are large and powerful enough to perform a variety of subsea maintenance and construction tasks, for which purpose they may be adapted by the addition of specialised skids and tools in a modular, interchangeable fashion. Such tools may, for example, include torque tools and reciprocating tools driven by hydraulic or electric motors or actuators.

Inspection-class ROVs are smaller but more manoeuvrable than work-class ROVs to perform inspection and monitoring tasks, although they may also perform light maintenance tasks such as cleaning using suitable tools. In addition to visual inspection using lights and cameras, inspection-class ROVs may hold sensors in contact with, or in proximity to, a subsea structure such as a pipeline to inspect and monitor its condition or other parameters.

Lights, cameras, sensors and electrically-driven tools carried by ROVs invariably comprise electrical systems. Even hydraulically-driven ROV tools may also contain electrical systems for control and monitoring.

AUVs are autonomous, robotic counterparts of ROVs. They move from task to task on a programmed course for limited periods without a physical connection to a surface support ship. However, they must make frequent trips to the surface or to a subsea garage or dock for battery recharging; they also require large batteries for adequate endurance between recharges.

To avoid the need for a UUV to make a lengthy trip to the surface whenever tools or sensors are to be interchanged, a set of tools or sensors may be stored in a deployment basket that is lowered to a suitable subsea location. The UUV can then fetch and carry the appropriate tool or sensor from the deployment basket to a work site.

WO 2009/061562 proposes a system for subsea work in which multiple untethered AUVs cooperate with a central docking station. The AUVs return to the docking station periodically to be reprogrammed and to charge their batteries. The docking station frees a support ship from having to remain on station at the surface. Similarly, WO 2013/072690 discloses a subsea garage to which an AUV may return periodically for protection, replenishment or recharging, and eventually for recovery to the surface.

In WO 2008/037349, a power generator is built into a docking station to recharge the AUV when it is coupled to the station. Conversely, U.S. Pat. No. 7,183,742 discloses a subsea UUV docking station comprises a fuel cell that is energised to generate electric power when a UUV is docked to the station, to recharge batteries on board the UUV.

In addition to receiving power, UUVs may provide power to other subsea systems either directly or by means of skids. For example, it is known from WO 2013/040296 for the battery of an autonomous skid to be recharged by underwater connection to the electrical system of an ROV.

Small battery-powered autonomous subsea units such as transponders and beacons are also known. Such units are typically UUV-portable to be placed at a desired subsea location. It has also been proposed for autonomous tools or sensors to be placed on or beside a subsea structure to perform operations on that structure independently of a UUV, To avoid the batteries of autonomous subsea units, tools, sensors or skids becoming depleted, a UUV may visit them periodically to connect electrically and recharge them. The UUV may either provide power from an on-board battery or via an umbilical providing power from the surface.

Each of the above examples requires a power-transmitting coupling to be effected underwater between electrical circuits of two discrete systems, namely the primary system providing power and the secondary system receiving power.

A subsea electric power coupling is most commonly effected by a wet-mated electrical connector. Simply by inserting a plug into a socket underwater, wet-mating couples an electrical cable or wire such as an umbilical or tether to subsea electrical equipment. Whilst simple in principle, wet-mating suffers from unreliability in its connection between contact elements, especially the risk of salt-water ingress causing power loss or short-circuit damage. Wet-mating also suffers from the effects of wear with repeated operation.

WO 01/21476 discloses a linelatch system for carrying power to an AUV from a surface platform via a flying latch vehicle that essentially acts as a flying power outlet for recharging the on-board power supply of the AUV. The power conveyed is electrical current or hydraulic power transferred via a wet-mate connection, i.e. a connector designed for mating and demating underwater.

To avoid these drawbacks, contactless or wireless alternatives have been proposed to avoid wet-mating between contact elements. For example U.S. Pat. No. 8,511,389 teaches inductive contactless power transfer in a subsea environment using a static inductive coupler. In that solution, subsea transfer of electrical energy is based on the principle of a transformer: it involves a primary winding located on a remote or mobile recharging unit such as an ROV and a secondary winding located on a power supply for electrical equipment that is to be recharged.

A static inductive solution suffers from poor efficiency, is bulky and requires huge power to achieve an adequate rate of energy transfer. Otherwise, it may provide too little current to recharge an AUV in an effective timescale. Consequently, static inductive solutions are generally restricted to powering electronic control systems that require much less current than electrical power systems.

WO 94/09558 and its equivalent U.S. Pat. No. 5,301,096 disclose a submersible contactless power delivery system for powering underwater electric loads such as underwater vehicles. A converter supplies high-frequency power to a submerged conductor loop that is suspended from a surface support vessel and extends to the seabed. The system delivers power to underwater loads through clamped-on or captive links attached at any location along the conductor loop. Linear translational movement may take place between the links and the loop although rotary motion, presumably of a link around the loop, is also mentioned but not described. The system is complex and wholly impractical, especially for use in deep-water applications.

WO 2013/085030 discloses a power transmission system that wirelessly transmits power underwater between two devices by means of magnetic field resonance. Each device is provided with a resonance coil that performs the power transmission. The first coil converts AC power to magnetic energy which is transmitted wirelessly to the second coil where it is reconverted into AC power.

It is against this background that the present invention has been devised. The invention aims to avoid the problems suffered by wet-mated electrical connectors and inductive couplers when providing a temporary power source to subsea equipment. The invention does so by avoiding the need for an electrical connection between the supplying system and the receiving system. The invention also minimises the size and weight of components of the receiving system in particular.

Consequently, the invention resides in a method of providing power to an electrical system of subsea equipment, underwater, without requiring a wet-mated electrical connection. The method comprises temporarily coupling a rotary coupling element of a power source to the subsea equipment and turning that element to generate electric power on board the equipment. Subsea equipment that implements the method comprises: an on-board electric power generator connected to an electrical load such as a rechargeable battery to charge the battery when the generator is driven; and a rotary coupling element that is turned by an external drive to drive the generator.

Alternative subsea equipment to implement the method comprises: a stator, but not a rotor, of an on-board electric power generator, which supplies current to the load when an externally-driven rotor is positioned adjacent to the stator and turned relative to the stator. A power source comprising a generator rotor is docked with the equipment for that purpose.

Briefly to summarise, the invention aims to provide electric power to autonomous subsea electrical equipment, such as tooling and AUVs. Power will usually be used to recharge batteries on board the electrical equipment. However it is possible instead to power the equipment directly or without charging a battery. In that case, the equipment may be activated when power is supplied to it and deactivated when the power supply is turned off.

The invention achieves its objective by providing separable systems to produce, supply and receive electric power temporarily. A primary power source is temporarily non-electrically coupled to a secondary power receiver to generate electric power on board the power receiver, namely the electrical equipment having an electrical load that needs to be supplied with current; for example, whose batteries are to be recharged. The temporary coupling is non-electric to avoid interference between sea water and electric currents.

More specifically, a small electric power generator, or a stator element of a power generator, remains permanently integrated in situ with the equipment whose electrical load is to be supplied with current. Electric power is generated on board that equipment by temporarily coupling a rotary power source to actuate or energise the generator or to provide a rotor element that completes the generator. The rotary power source includes a motor that suitably turns a stem or shaft, which is temporarily coupled to a receptacle or other coupling element that turns the generator to produce electric power. The motor may, for example, be implemented by a standard ROV torque tool. Other coupling arrangements are possible, as will be described.

Accordingly, the invention removes the need for wet-mated electrical connections. It allows usefully high levels of power transfer while minimising the size, weight and complexity of equipment on the secondary side especially. It employs mechanical or hydraulic systems and interfaces that are well understood and accepted in the subsea engineering industry.

From one aspect, the invention provides a method of providing electric power to subsea equipment underwater. The method comprises: temporarily coupling a rotary coupling element of a power unit to the subsea equipment; and turning the rotary coupling element to generate electric power on board the subsea equipment.

In some embodiments, the invention comprises coupling a first rotary coupling element of the subsea equipment to a second rotary coupling element of the power unit, and turning the first rotary coupling element to drive a generator on board the subsea equipment to generate electric power. Mechanical engagement and/or magnetic coupling may be effected between the first and second rotary coupling elements.

Where magnetic coupling is chosen, this may be effected without contact between the first and second rotary coupling elements, thus enabling one or both of those elements to be enclosed and protected from sea water in use. For example, an enclosure around a rotary coupling element may comprise a window aligned with that element, the window being magnetically transparent relative to a surrounding wall of the enclosure.

Another approach to coupling is to effect electromagnetic coupling between the rotary coupling element of the power unit and a stator of the subsea equipment. For example, the rotary coupling element of the power unit and the stator of the subsea equipment may be brought together to form a generator. That generator, whose key components are split between the power unit and the subsea equipment, will generate electric power on board the subsea equipment upon rotation of the rotary coupling element relative to the stator.

Preferably, the power unit and/or the subsea equipment are stabilised against torque reaction forces by effecting a secondary attachment between the power unit and the subsea equipment.

To implement the methods of the invention, the invention also resides in items of subsea equipment that occasionally require power to be supplied to them from an external source. In one sense, the equipment of the invention comprises: at least one on-board electrical load; an on-board electric power generator connected to the load to supply electric current to the load when the generator is driven; and a rotary coupling element arranged to be turned by an external drive to drive the generator. In another sense to implement the split-generator method of the invention, the equipment of the invention comprises: at least one on-board electrical load; and a stator, but not a rotor, of an on-board electric power generator that is connected to the load to supply electric current to the load when an externally-driven rotor is positioned adjacent to the stator and turned relative to the stator.

For example, the electrical load may comprise at least one on-board rechargeable battery, in which case the generator, or the stator of a split generator, is connected to the battery to charge the battery when the generator is driven.

The rotary coupling element of the equipment may be shaped to effect mechanical engagement with the external drive and/or arranged to effect magnetic coupling with the external drive.

The inventive concept embraces a subsea system for providing electric power to subsea equipment of the invention underwater, wherein the system comprises a power unit that is separate from the subsea equipment and that implements the external drive. For example, the subsea equipment suitably comprises a first rotary coupling element and the external drive comprises a second rotary coupling element that turns the first rotary coupling element to drive the on-board electric power generator.

Either or both of the power unit and the subsea equipment may have one or more alignment formations for aligning the subsea equipment and the power unit. Similarly, either or both of the power unit and the subsea equipment may have one or more secondary attachment points for stabilising the subsea equipment and/or the power unit against torque reaction forces in use.

The inventive concept also extends to: a subsea power unit for providing power to discrete subsea equipment underwater; and a subsea system for providing electric power to subsea equipment underwater, the system comprising such a power unit. The power unit of the invention comprises: a rotary coupling element being a generator rotor including magnets or windings; and a motor for turning the rotor. A magnetically-transparent enclosure may house the generator rotor and separate the generator rotor from sea water in use.

Bearing formations may be spaced axially along an axis of rotation of the rotor, for example one or more circumferential flanges extending around the rotor and/or a pivot formation disposed on the axis of rotation of the rotor.

Figure 1B:
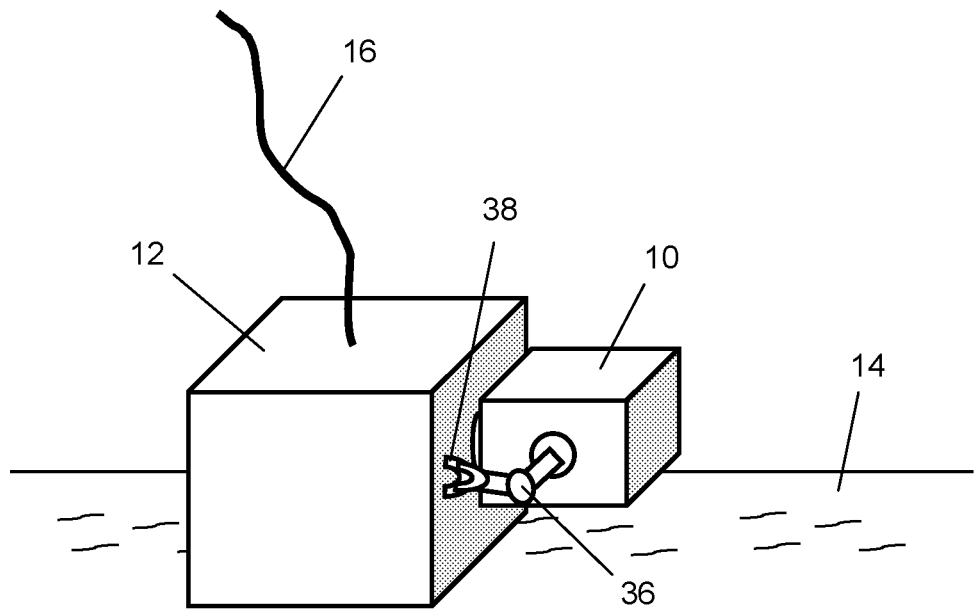
Figure 2A:
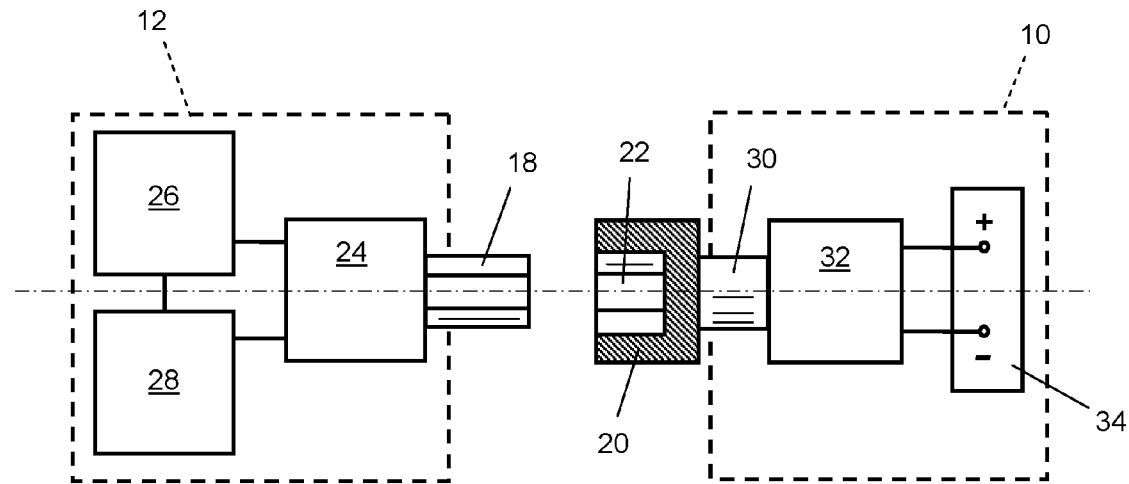
Figure 2B:
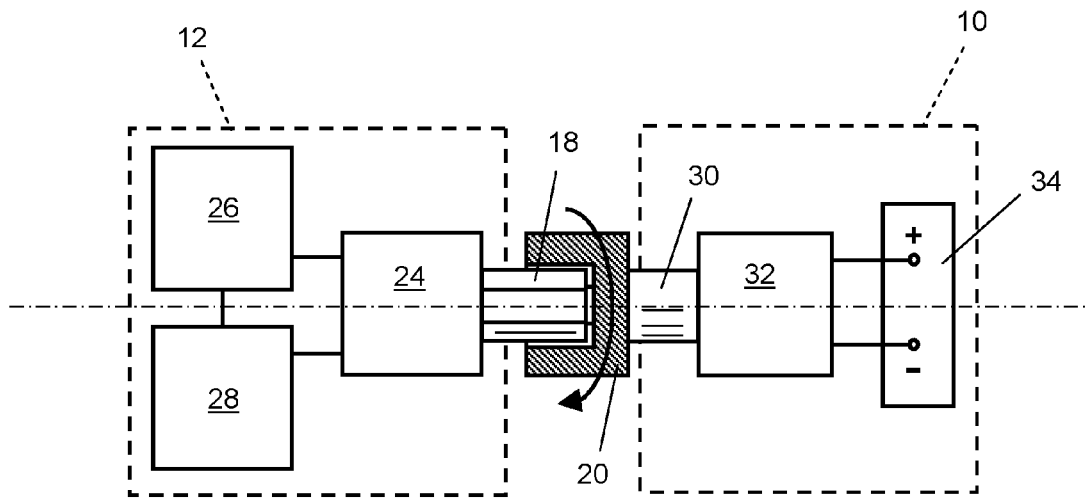
Figure 3A:
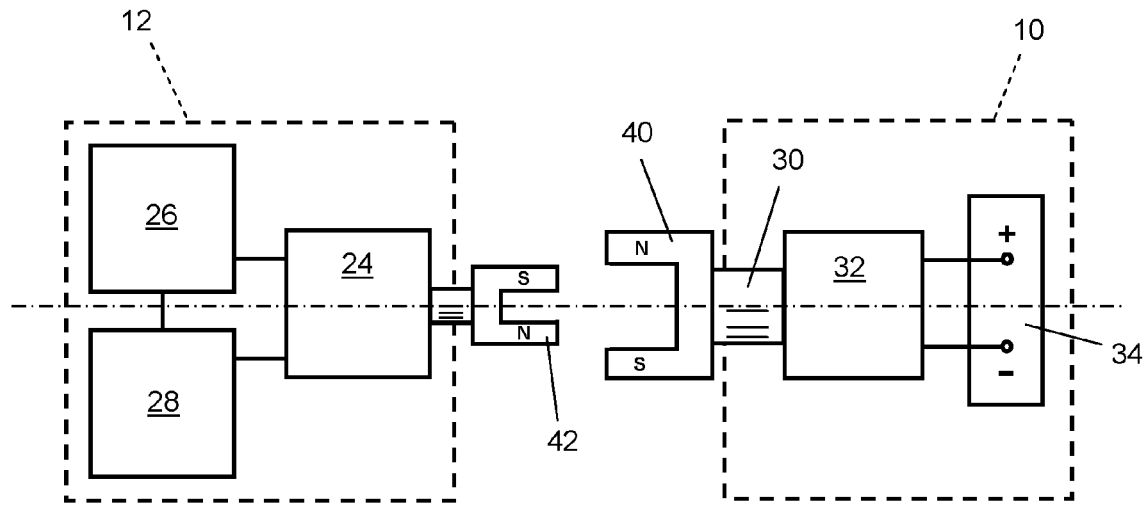
Figure 3B:
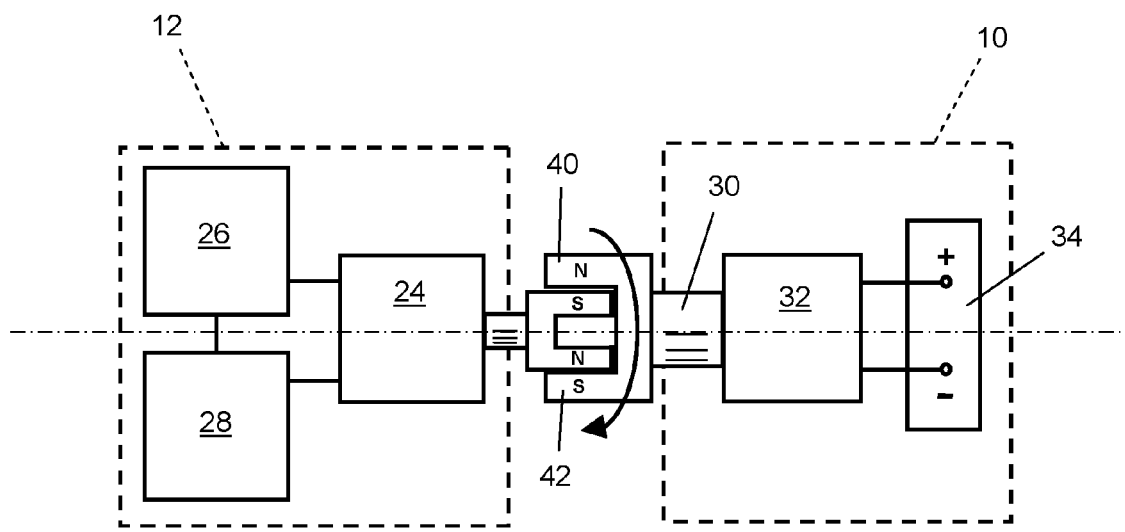
Figure 4A:
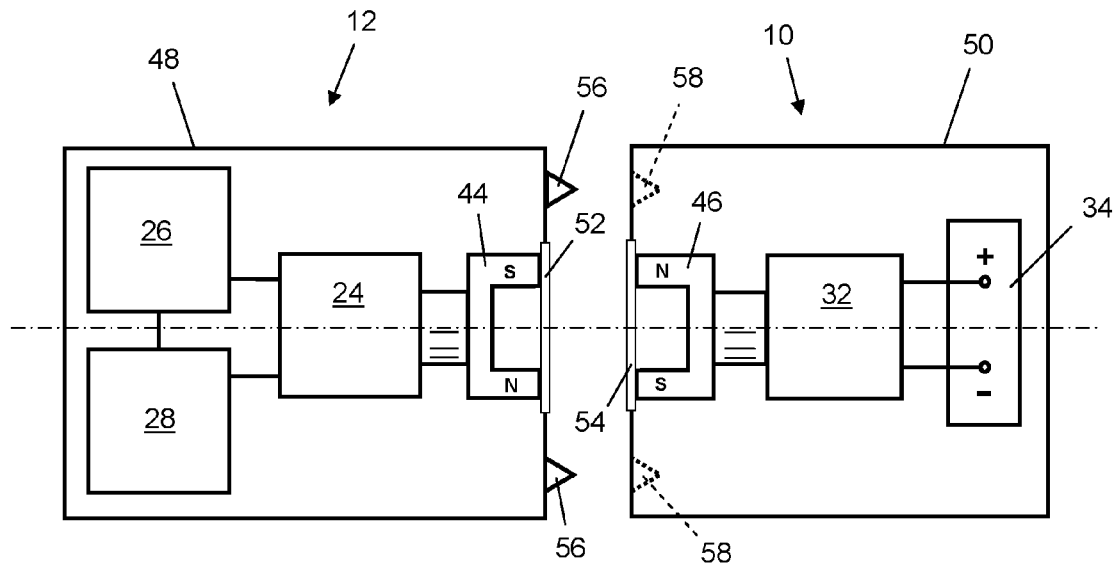
Figure 4B:
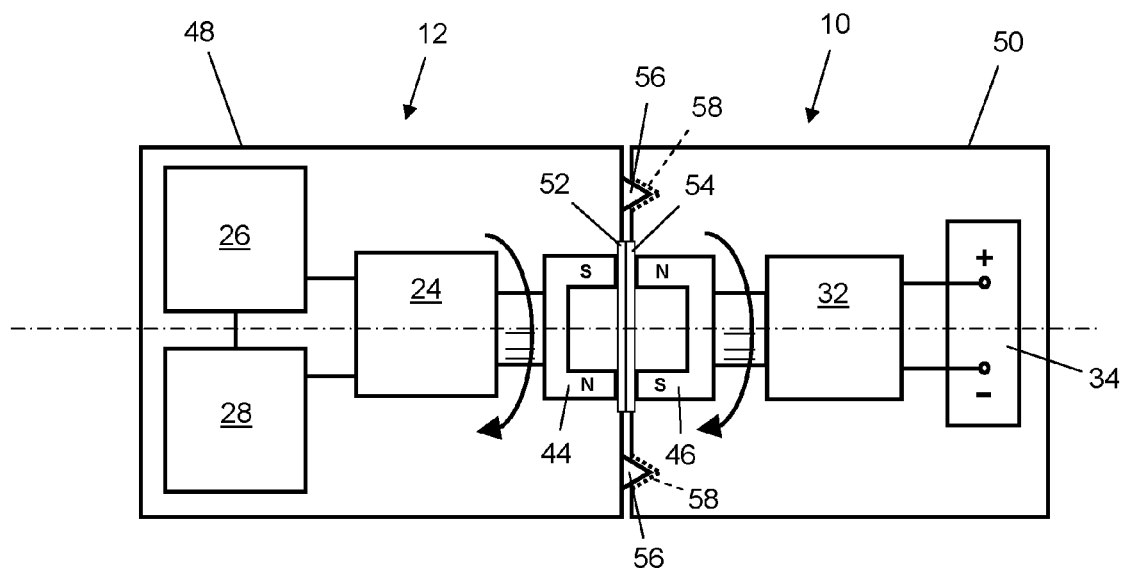
Figure 5A:
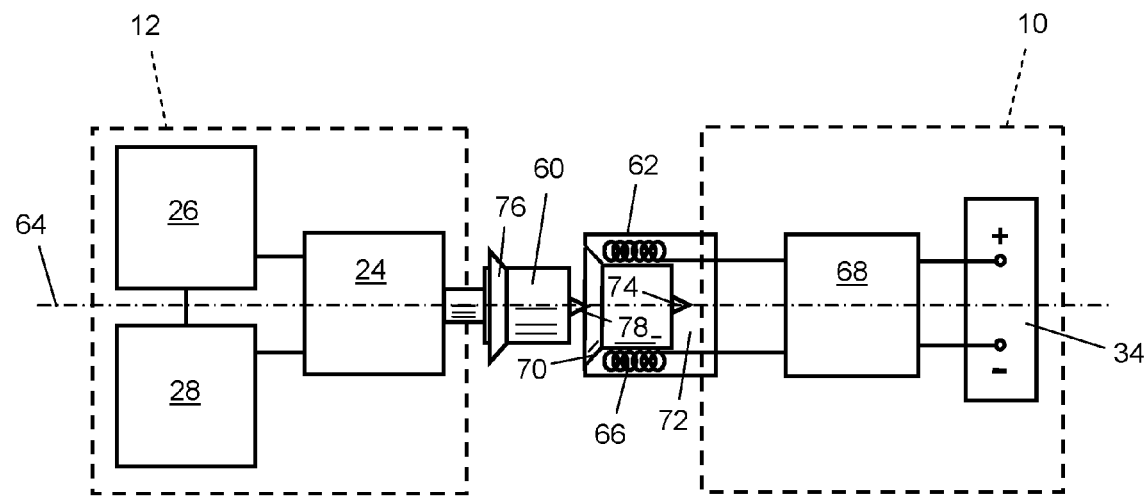
Figure 5B:
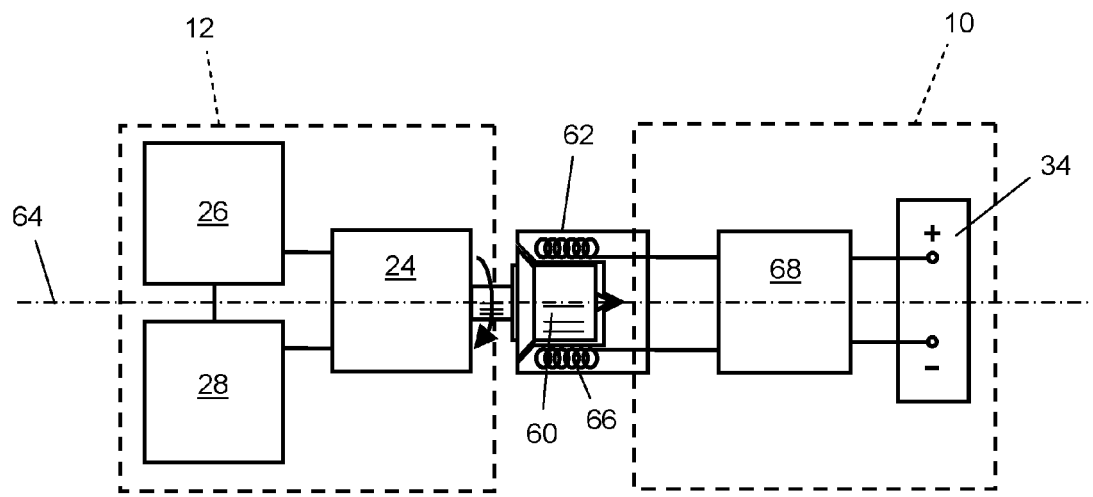
Figure 6A:
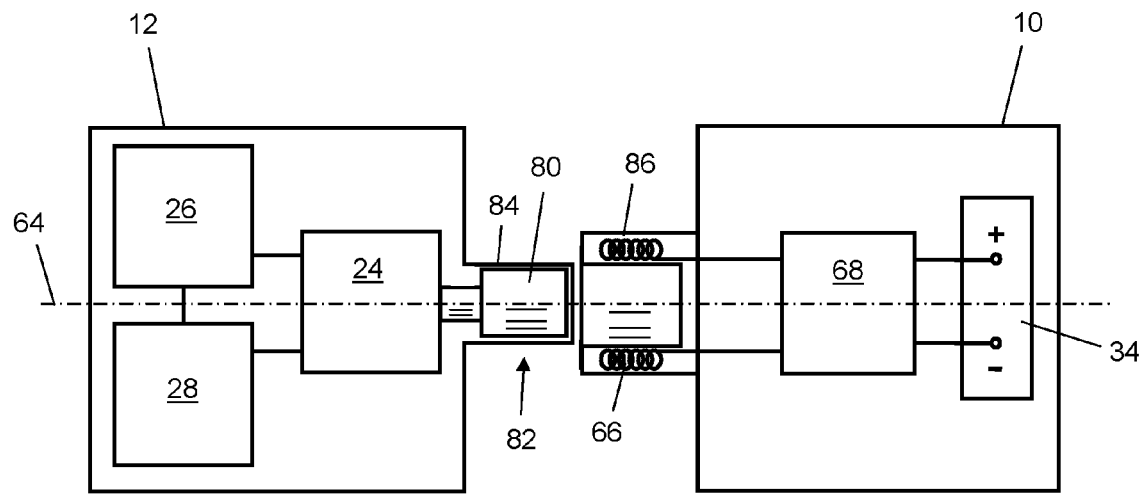
Figure 6B:
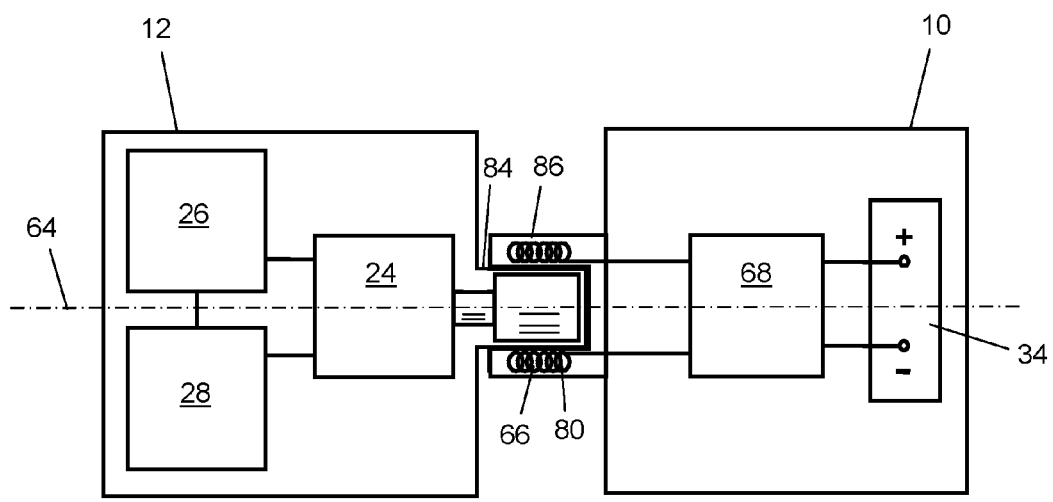
Figure 7A:
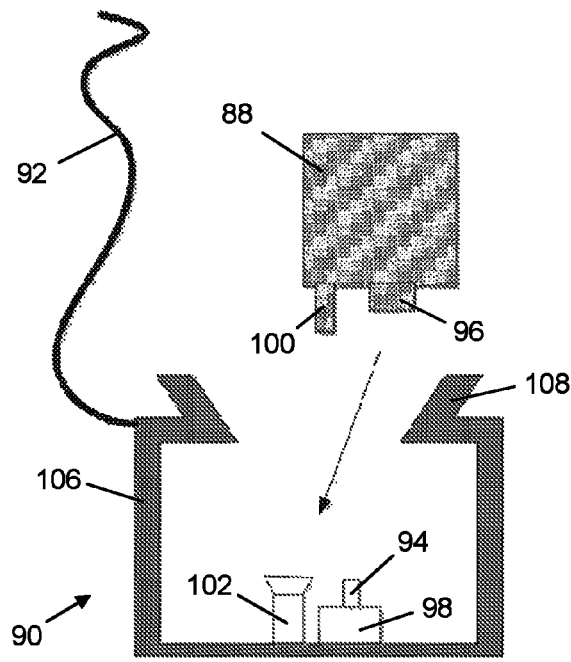
Figure 7B:
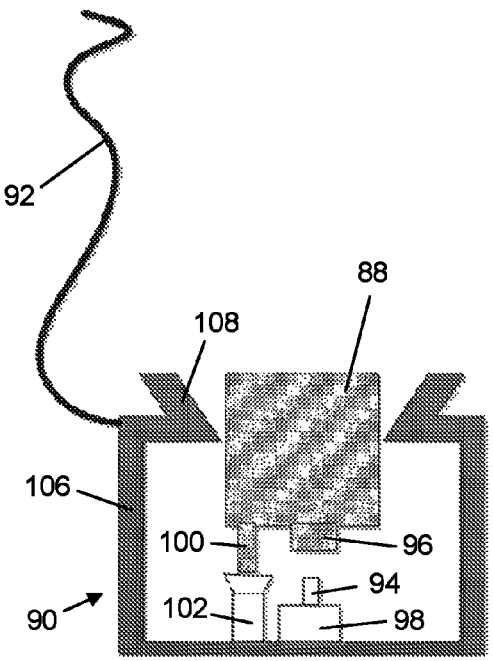
Figure 7C:
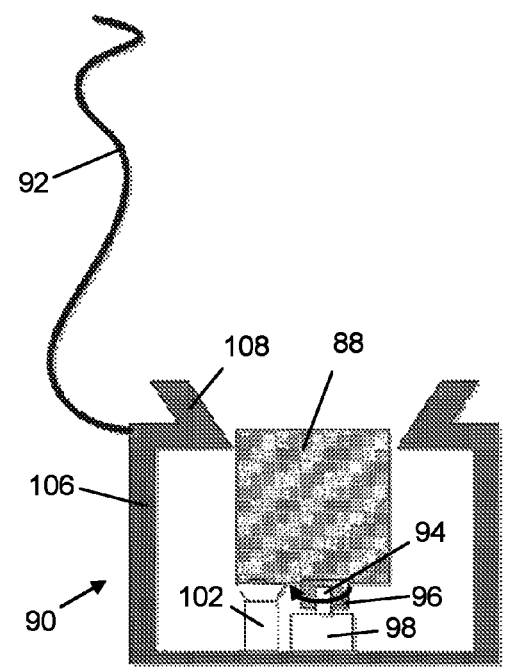
Figure 8:
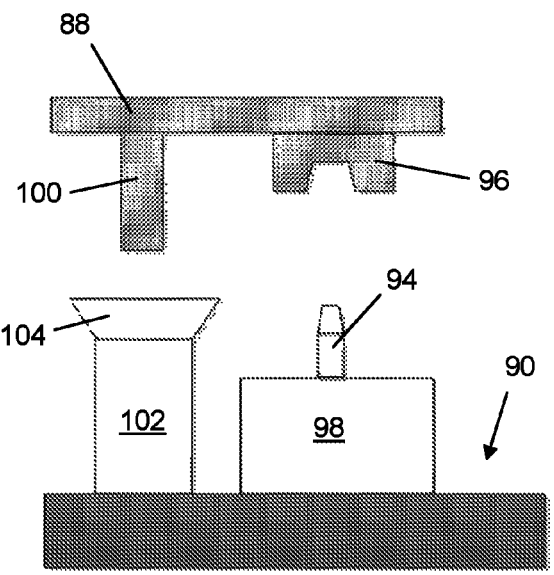

In order that the invention may be more readily understood, reference will now be made, by way of example, to the accompanying drawings, in which:

FIG. 1a is a schematic perspective view of an AUV approaching a subsea charging station, those subsea systems being equipped for transfer of power from the charging station to the AUV in accordance with the invention;

FIG. 1b corresponds to FIG. 1a but shows the AUV coupled with the charging station so that the charging station may transfer power to the AUV;

FIGS. 2a and 2b are schematic part-sectional views of the AUV and the charging station of FIGS. 1a and 1b with the AUV respectively about to couple and coupled with the charging station, in this instance via a mechanical rotary coupling;

FIGS. 3a and 3b correspond to FIGS. 2a and 2b respectively but show a magnetic rotary coupling between the AUV and the charging station;

FIGS. 4a and 4b correspond to FIGS. 3a and 3b respectively but show a variant of the magnetic rotary coupling shown in those figures;

FIGS. 5a and 5b correspond to FIGS. 2a and 2b respectively but show a split generator arrangement comprising a rotor of the charging station cooperating with a stator of the AUV to effect electromagnetic coupling between those subsea systems;

FIGS. 6a and 6b correspond to FIGS. 5a and 5b respectively but show a variant of the split generator arrangement shown in those figures;

FIGS. 7a to 7c are a sequence of schematic part-sectional views of an AUV approaching, aligning with and coupling with a subsea charging station using various alignment and attachment features; and FIG. 8 is an enlarged detail view of some of the alignment and attachment features visible in FIGS. 7a to 7c.

FIGS. 1a and 1b of the drawings show the invention in the context of an AUV 10 whose on-board battery requires occasional recharging, preferably without the AUV 10 having to return wastefully to a surface support vessel on each occasion.

For the purpose of recharging, FIG. 1a shows the AUV 10 moving toward a subsea charging station 12 placed on the seabed 14. FIG. 1b then shows the AUV 10 coupled with the charging station 12 so that the charging station 12 can transfer power to the AUV 10.

The charging station 12 may have on-board facilities for electricity generation and storage or may be supplied with electrical or hydraulic power from an external source, for example electrical power from a surface installation via an umbilical 16 as shown.

FIGS. 1a, 2a and 2b show cooperable mechanical coupling elements of the AUV 10 and the charging station 12, whereby mechanical power may be transferred from the charging station 12 to the AUV 10 for conversion into electrical energy on board the AUV 10.

In this example, the coupling elements are a male rotor 18 on the charging station 12 and a female rotary socket 20 on the AUV 10. The rotor 18 protrudes from the charging station 12 and is shaped to mate engagingly within a complementarily-shaped cavity 22 of the socket 20 as the AUV 10 docks with the charging station 12.

The coupling elements 18, 20 shown in FIGS. 1a, 2a and 2b are arranged to transmit torque; so, once the rotor 18 is engaged in the cavity 22, the rotor 18 can start turning to turn the socket 20.

In the example shown, the rotor 18 and the cavity 22 have complementary hexagonal transverse cross-sections to lock them against relative angular movement in use. It would be possible to adopt other interlocking cross-sectional shapes such as other polygonal shapes.

FIGS. 2a and 2b show that the rotor 18 is spun, in use, by a motor 24 in the charging station 12. The motor 24 is powered, in turn, by a power source 26 in the charging station 12 and is controlled by a controller 28. The motor 24 may be an electric or hydraulic motor; consequently, the power source 26 may supply electrical or hydraulic power to the motor 24 as appropriate.

The controller 28 is suitably programmed to respond to a sensor (not shown) that confirms engagement between the rotor 18 and the socket 20 before the controller 28 can start the motor 24.

FIGS. 2a and 2b also show that the socket 20 is connected by a drive shaft 30 to a rotary electromagnetic machine in the AUV 10, exemplified here as a DC generator 32 although an alternator is also possible. The generator 32 converts mechanical energy of the rotating socket 20 into electrical energy to charge an on-board battery 34 of the AUV 10.

Optionally, the rotor 18 is connected to the motor 24 and/or the socket 20 is connected to the generator 32 in a compliant manner to deal with alignment tolerances. For example, flexible couplings or joints (not shown) may be incorporated between the rotor 18 and the motor 24 and/or between the socket 20 and the generator 32.

The AUV 10 may attach itself to the charging station 12 at an additional attachment point to stabilise the AUV 10 against torque reaction forces as the rotor 18 and socket 20 rotate in use. For example, a manipulator arm 36 of the AUV 10 may grab a handle 38 provided on the charging station 12 as shown in FIGS. 1a and 1b.

Other attachment arrangements to resist torque reaction forces are possible, such as fixed connector elements on the AUV 10 and the charging station 12 positioned to align, come together and engage when the rotor 18 aligns and engages with the socket 20. Arrangements of this type are shown in FIGS. 4a and 4b, in FIGS. 7a to 7c and in FIG. 8; they may be applied to other embodiments of the invention.

The mechanical coupling arrangement shown in FIGS. 1a, 2a and 2b requires reasonably accurate alignment between the rotor 18 and the shaft 20. Also, the motor 24 and the generator 32 require shaft seals that will be in contact with sea water in use. However, the arrangement has the advantages of simplicity and the capability of transmitting substantial levels of power.

FIGS. 3a and 3b show alternative coupling elements that are also arranged to transmit torque between the AUV 10 and the charging station 12, in this case magnetic coupling elements 40, 42 respectively. Here, dissimilar poles of the coupling elements 40, 42 align with and attract each other as those elements 40, 42 come together.

Mechanical engagement between the magnetic coupling elements 40, 42 is also possible, as FIGS. 3a and 3b show. In this respect, it will be noted that the coupling element 42 of the charging station 12 has a male shape while the coupling element 40 of the AUV 10 has a complementary female shape.

Both of the magnetic coupling elements 40, 42 can be open to sea water as FIGS. 3a and 3b show. Again, therefore, the motor 24 and the generator 32 will require shaft seals that will be in contact with sea water in use. To avoid this, FIGS. 4a and 4b show another approach, which is for one or both of magnetic coupling elements 44, 46 to be disposed inside an oil-filled housing 48, 50 with the motor 24 and/or the generator 32 respectively.

In the example shown in FIGS. 4a and 4b, windows 52, 54 seal the housings 48, 50 and are aligned with the magnetic coupling elements 44, 46 which, in use, spin within the housings 48, 50 immediately behind the windows 52, 54. The windows 52, 54 are thin plates or membranes of plastics, stainless steel or a non-ferrous metal such as titanium.

When the housings 48, 50 of the AUV 10 and the charging station 12 come together and abut, their windows 52, 54 also align and abut, thus also aligning the magnetic coupling elements 44, 46 that lie behind the windows 52, 54. The windows 52, 54 are thin enough to be magnetically transparent, at least to the extent that magnetic attraction between the coupling elements 44, 46 can act through the windows 52, 54 with sufficient strength to allow effective torque transmission between the coupling elements 44, 46.

To ensure alignment and to resist torque reaction forces when the coupling elements 44, 46 spin, connector elements exemplified here as tapered lugs 56 on the housing 48 of the charging station 12 engage in complementary depressions 58 provided in the housing 50 of the AUV 10.

Whilst alignment during engagement and disengagement requires magnetic forces to be dealt with, the arrangement shown in FIGS. 4a and 4b has the potential to obviate shaft seals on the motor and/or the generator. Also, a brushless alternator with no permanent magnets can be used as the generator.

FIGS. 5a, 5b, 6a and 6b show embodiments of the invention in which electromagnetic coupling is effected between the charging station 12 defining a primary circuit and the AUV 10 defining a secondary circuit. These embodiments have the advantage of requiring no moving parts on the secondary system, although some decoupling force may be required to overcome the magnetic field.

In the embodiment shown in FIGS. 5a and 5b, the coupling elements are generator elements that are split between the AUV 10 and the charging station 12. The generator elements come together to form a generator unit, here an alternator, when the AUV 10 docks with the charging station 12.

In this example of the split-generator concept, the motor 24 in the charging station 12 turns a cylindrical generator rotor 60 that is arranged to fit into and to rotate within an annular stator 62 of the AUV 10 to effect electromagnetic coupling. In effect, the stator 62 forms a socket that can receive the rotor 60 when the rotor 60 and the stator 62 are aligned on a common central longitudinal axis 64.

The stator 62 contains windings 66 whereas the rotor 60 carries magnets (not shown). The windings 66 are connected to an electronic control and charging unit 68 that, in turn, charges the on-board battery 34 of the AUV 10.

The windings 66 are suitably potted in resin to insulate them from sea water. The magnets of the rotor 60 can be encapsulated but open to sea water or be part of a thin-walled, magnetically-transparent plug that is inserted into the stator 62.

One end of the stator 62 is open to receive the rotor 60 and is surrounded by a frusto-conical bearing surface 70 that faces away from the stator 62 and toward the central longitudinal axis 64. The other end of the stator 62 is closed by an end wall 72 that has a central bearing recess 74 positioned on the central longitudinal axis 64.

The rotor 60 is surrounded by a circumferential flange near its proximal end defining a distally-facing frusto-conical bearing surface 76. A central bearing spigot 78 on the central longitudinal axis 64 protrudes distally from the distal end of the rotor 60.

When the rotor 60 is fully engaged within the stator 62 as shown in FIG. 5b, the bearing surface 76 of the rotor 60 fits closely against the opposed complementary bearing surface 70 of the stator 62. Simultaneously, the spigot 78 engages in the recess 74 in the end wall 68 of the stator 62. The bearing surfaces 70, 76, the spigot 78 and the recess 74 interact to keep the rotor 60 aligned with the central longitudinal axis 64 while maintaining an efficiently small clearance between the rotor 60 and the stator 62.

In subsea use, water will serve as an effective lubricant between the bearing surfaces 70, 76, the spigot 78 and the recess 74. However, those surfaces may also be coated or impregnated with a low-friction or wear-resistant material such as PTFE.

FIGS. 6a and 6b show a variant of the split-generator arrangement shown in FIGS. 5a and 5b. Like numerals are used for like parts. Here, the rotor 80 is not exposed like the rotor 60 of FIGS. 5a and 5b but instead is encapsulated in an oil-filled cylindrical plug 82 integrated with and protruding from an oil-filled housing of the charging station 12. The plug 82 has a thin magnetically-transparent tubular wall 84 that closely surrounds the cylindrical rotor 80.

The tubular wall 84 of the plug 82 is dimensioned to fit closely within a tubular stator 86 on the charging station 12 when the AUV 10 docks with the charging station 12. This has the advantage that all moving parts are contained within the plug 82, meaning that there are no rotating parts between the stator 86 and the plug 82 that mates within it. Also, the rotor 80 and its associated bearings are protected inside the plug 82.

Finally, FIGS. 7a to 7c show an AUV 88 approaching, aligning with and coupling with a subsea charging station 90 supplied with energy from the surface through an umbilical 92.

The AUV 88 and the charging station 90 employ various alignment and attachment features, which will now be described with reference to FIGS. 7a to 7c and also to the enlarged detail view of FIG. 8. It will be appreciated that similar alignment and attachment features may be used with the previous embodiments of the invention.

In FIGS. 7a to 7c, the power-transmitting coupling elements are an upstanding male rotor 94 on the charging station 90 and a downwardly-opening female rotary socket 96 on the AUV 88, serving as a coupling receptacle for the rotor 94. The rotor 94 is driven by a motor 98.

The socket 96 is disposed on the underside of the AUV 88 beside a cylindrical guide post 100 that hangs from the AUV 88 to a level below the socket 96. The guide post 100 has a central longitudinal axis that is spaced from a parallel axis of rotation of the socket 96. An upstanding tubular guide receptacle 102 on the charging station 90 has a central longitudinal axis that is spaced at a corresponding distance from a parallel axis of rotation of the rotor 94. The guide receptacle 102 is dimensioned to receive the guide post 100.

As best shown in FIG. 8, the guide receptacle 102 has an outwardly-flared frusto-conical mouth 104 to guide the guide post 100 into the top of the guide receptacle 102. Similarly, the rotor 94 has an upwardly-tapering distal end to ease insertion of the rotor 94 into the socket 96, which has a complementary female shape as shown.

The charging station 90 comprises a hollow open-topped enclosure 106 that is arranged to accommodate the AUV 88 upon docking. The open top of the enclosure 106 has an outwardly-flared frusto-conical surround 108 to guide the approaching AUV 88 into the enclosure 106 from above, as shown in FIG. 7a.

As the AUV 88 enters the open top of the enclosure 106 as shown in FIG. 7b, the guide post 100 enters the guide receptacle 102. This ensures rough alignment and provides a pivot about which the AUV 88 can turn for fine positioning to align its socket 96 precisely with the rotor 94 of the charging station 90. The AUV 88 can then lower fully into the enclosure 106 to complete docking with the charging station 90 as the rotor 94 enters the socket 96 as shown in FIG. 7c. The motor 98 can then turn the rotor 94 and the mated socket 96 to transfer power from the charging station 90 to the AUV 88.

In addition to facilitating alignment of the socket 96 and the rotor 94, engagement of the guide post 100 in the guide receptacle 102 resists torque reaction forces when the rotor 94 and the mated socket 96 spin.

Whilst the embodiment of FIGS. 7a to 7c and FIG. 8 shows mechanical coupling between a male rotor and a female socket receptacle like the arrangement shown in FIGS. 1a, 1b, 2a and 2b, it should be understood that this embodiment could instead employ magnetic or electromagnetic coupling like the proposals shown in FIGS. 3a and 3b, 4a and 4b, 5a and 5b and 6a and 6b.

Although the illustrated embodiments aim to recharge on-board batteries of subsea equipment exemplified by an AUV, it is possible to power an electrical load other than a battery, such as a motor. In that case, the batteries shown in the appended drawings may be replaced by a different electrical load or they may be connected to a generator or stator in conjunction with a different electrical load. It is also possible to power subsea equipment other than an AUV, such as a tool.

In general terms, the system of the invention should preferably be capable of providing at least 1 Kw of power. By way of illustration, a standard 1 Kw alternator such as those used in the wind power industry is approximately 270 mm in diameter and 150 mm long, with a weight of about 20-25 Kg. Larger units could provide, say, 5-10 Kw.

Voltage and current are suitably configurable based on the output requirements. For example, for smaller units, a DC voltage output could be up to 100 V at 10 A. For AC supply for similar units, this could fall to 110 $V_{ac}$ at 5 A.

The invention has many applications for transmitting power between subsea systems without requiring wet-mated electrical connections. For example, the invention may be used to power a skid that is temporarily attached to a UUV such as an ROV, which would make subsea swapping of skids easier. The secondary system could be an autonomous tool or sensor powered by batteries that are recharged from a primary system being a UUV or its skid. Indeed, a UUV need not be involved at all; in principle, a manned submersible or a diver may be involved in coupling a primary power supply to a secondary power receiver in accordance with the invention.

The use of a motor stem is merely an illustration: practically, a standard electrically- or hydraulically-powered torque tool of an ROV or AUV can be used to rotate any device, including the generator of the invention.

Many other variations are possible within the inventive concept. For example, a brushless alternator with no permanent magnets or a permanent-magnet alternator may be used to convert mechanical energy to electrical energy within the secondary system, such as an AUV, to which energy is supplied by the primary system, such as a subsea charging station.

Alternators or other generator units used in the invention are preferably oil-filled to balance hydrostatic pressure at depth and to resist ingress of sea water. An oil fill is electrically insulating and carries heat away from the windings to cool the generator. Cooling improves efficiency and maximises power output, noting that power output is normally limited by the risk of overheating.

Skilled readers will appreciate that it is possible to reverse the arrangement shown in FIGS. 5a, 5b, 6a and 6b by adopting windings in the rotor and magnets on the stator, which may make alignment between the systems easier. Also, it would be possible for the male/female rotor/stator relationship to be reversed, and hence for a female rotor to turn around a male stator.

Similarly, the use of a male coupling element on the primary power source and a female coupling element of the secondary power receiver as shown in FIGS. 2a, 2b, 3a and 3b can be reversed; indeed, the use of male/female coupling elements is not essential as other coupling formations are possible.

Where necessary, data transfer between subsea systems such as an AUV and a subsea charging station or between an ROV and a skid can be effected wirelessly, for example by wi-fi or optical data connections. Also, any desired hydraulic connections between subsea systems can be effected in parallel as power transfer takes place. For example, a stab connector of a type well-known in the art may be positioned to connect hydraulic circuits of the respective systems during docking, as rotary connector elements of the invention are brought together for power transmission as described in this specification.

The invention claimed is:
1. A method of providing electric power to subsea equipment underwater, the method comprising:

temporarily coupling a rotary coupling element of a power unit to the subsea equipment;

effecting electromagnetic coupling between the rotary coupling element of the power unit and a stator of the subsea equipment by bringing together the rotary coupling element of the power unit and the stator of the subsea equipment, the electromagnetic coupling of the rotary coupling element of the power unit and the stator of the subsea equipment forms a generator that generates the electric power on board the subsea equipment upon rotation of the rotary coupling element of the power unit;

turning the rotary coupling element to generate electric power on board the subsea equipment; and stabilizing the power unit and/or the subsea equipment against torque reaction forces by effecting a secondary attachment between the power unit and the subsea equipment.

2. A subsea system for providing electric power to subsea equipment underwater, wherein the subsea equipment requires intermittent supply of power from an external source, the equipment comprising:

at least one on-board electrical load;

an on-board electric power generator connected to the load to supply electric current to the load when the generator is driven;

a first rotary coupling element arranged to be turned by an external drive to drive the generator wherein the first rotary coupling element is arranged to effect magnetic coupling with the external drive and is housed in an enclosure that is arranged to separate the first rotary coupling element from sea water in use; and one or more secondary attachment points for stabilizing the subsea equipment against torque reaction forces when the first rotary coupling element is turned by the external drive;

the system further comprising a power unit that is separate from the subsea equipment and that implements the external drive;

wherein the external drive comprises a second rotary coupling element that is arranged to effect magnetic coupling with the first rotary coupling element and that turns the first rotary coupling element to drive the on-board electric power generator; and wherein the second rotary coupling element is housed in an enclosure that is arranged to separate the second rotary coupling element from sea water in use.

3. The equipment of claim 2, wherein the electrical load comprises at least one on-board rechargeable battery and the generator is connected to the battery to charge the battery when the generator is driven.

4. The system of claim 2, wherein the enclosure comprises a window aligned with the second rotary coupling element, the window being magnetically transparent relative to a surrounding wall of the enclosure.

5. The system of claim 2, comprising one or more alignment formations for aligning the subsea equipment and the power unit.

6. A subsea system for providing electric power to subsea equipment underwater, wherein the subsea equipment requires intermittent supply of power from an external source, the equipment comprising:

at least one on-board electrical load;

a male or female stator that is connected to the load and that is arranged to have an externally-driven rotor temporarily placed in or around the stator to complete an electric power generator for supplying electric current to the load when the rotor is placed in or around the stator and turned relative to the stator; and one or more secondary attachment points for stabilizing the subsea equipment against torque reaction forces when the rotor is turned relative to the stator;

the system further comprising a power unit that is separate from the subsea equipment and that implements the external drive for the rotor, wherein the rotor is housed in a magnetically-transparent enclosure to separate the rotor from sea water in use.

7. The system of claim 6, wherein the electrical load comprises at least one on-board rechargeable battery and the stator is connected to the battery to charge the battery when the externally-driven rotor is placed in or around the stator and turned relative to the stator.

8. The system of claim 6, comprising one or more alignment formations for aligning the subsea equipment and the power unit.

9. The system of claim 6, comprising one or more secondary attachment points for stabilising the subsea equipment and/or the power unit against torque reaction forces in use.

10. A subsea power unit for providing power to discrete subsea equipment underwater, the power unit comprising:

a rotary coupling element being a rotor for a generator including magnets or windings;

a motor for turning the rotor; and one or more secondary attachment points for stabilizing the power unit and/or the subsea equipment against torque reaction forces in use; and comprising an enclosure that houses the generator rotor and is arranged to separate the generator rotor from sea water in use.

11. The power unit of claim 10, wherein the rotor comprises bearing formations spaced axially along an axis of rotation of the rotor.

12. The power unit of claim 11, wherein the bearing formations comprise a circumferential flange extending around the rotor.

13. The power unit of claim 11, wherein the bearing formations comprise a pivot formation disposed on the axis of rotation of the rotor.

14. A subsea system for providing electric power to subsea equipment underwater, wherein the subsea equipment comprises:

at least one on-board electrical load;

a male or female stator that is connected to the load and that is arranged to have an externally-driven rotor temporarily placed in or around the stator to complete an electric power generator for supplying electric current to the load when the rotor is placed in or around the stator and turned relative to the stator; and comprising a subsea power unit that is separate from the subsea equipment and is as defined in claim 10.

* * * * *